(12) United States Patent
Zeng et al.

(10) Patent No.: US 12,250,396 B2
(45) Date of Patent: Mar. 11, 2025

(54) AFFINE PREDICTION METHOD AND RELATED DEVICES

(71) Applicant: ZHEJIANG DAHUA TECHNOLOGY CO., LTD., Hangzhou (CN)

(72) Inventors: Feiyang Zeng, Hangzhou (CN); Dong Jiang, Hangzhou (CN); Jucai Lin, Hangzhou (CN); Jun Yin, Hangzhou (CN); Cheng Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 180 days.

(21) Appl. No.: 17/739,185

(22) Filed: May 9, 2022

(65) Prior Publication Data

US 2022/0272374 A1 Aug. 25, 2022

Related U.S. Application Data

(63) Continuation of application No. PCT/CN2020/138402, filed on Dec. 22, 2020.

(30) Foreign Application Priority Data

Dec. 27, 2019 (CN) .......................... 201911383635.3
Dec. 30, 2019 (CN) .......................... 201911397687.6

(51) Int. Cl.
*H04N 19/513* (2014.01)
*H04N 19/103* (2014.01)
(Continued)

(52) U.S. Cl.
CPC ......... *H04N 19/513* (2014.11); *H04N 19/103* (2014.11); *H04N 19/174* (2014.11); *H04N 19/176* (2014.11)

(58) Field of Classification Search
CPC .. H04N 19/103; H04N 19/139; H04N 19/174; H04N 19/176; H04N 19/51; H04N 19/513; H04N 19/59
See application file for complete search history.

(56) References Cited

U.S. PATENT DOCUMENTS 11,323,731 B2 * 5/2022 Li ......................... H04N 19/105
11,432,002 B2 * 8/2022 Kang ..................... H04N 19/46
(Continued)

FOREIGN PATENT DOCUMENTS

CN 1879419 A 12/2006
CN 102665061 A 9/2012
(Continued)

OTHER PUBLICATIONS

Joint Video Experts Team (JVET) of ITU-T SG 16 WP 3 and ISO/IEC JTC 1/sc 29/WG 11 16th Meeting:Geneva, CH, Oct. 1-11.Publication date: Sep. 11, 2011,p. 248-289(43 pages).
(Continued)

*Primary Examiner* — Peter D Le (57) ABSTRACT

The present provides an affine prediction method and related devices. The method may include: dividing a current coding block into multiple sub-blocks, and determining an initial prediction value of all pixels in each of the sub-blocks; dividing each of the sub-blocks into multiple fraction blocks, wherein at least one of the fraction blocks comprises at least two integer pixels; determining a motion vector difference and a gradient of each of the fraction blocks; calculating a pixel compensation value of each of the fraction blocks based on the motion vector difference value and the gradient; taking the pixel compensation value of each of the fraction blocks as a pixel compensation value of all pixels in each of the fraction blocks; and calculating a final prediction value of each pixel in the current coding
(Continued)

block by the initial prediction value of each pixel and the pixel compensation value.

16 Claims, 3 Drawing Sheets

(51) Int. Cl.
   *H04N 19/174* (2014.01)
   *H04N 19/176* (2014.01)

(56) References Cited

U.S. PATENT DOCUMENTS

| | | | | |
|---|---|---|---|---|
| 2003/0081682 | A1* | 5/2003 | Lunter | G06T 7/269 |
| | | | | 348/E5.066 |
| 2013/0058394 | A1* | 3/2013 | Nilsson | H04N 19/61 |
| | | | | 375/E7.153 |
| 2015/0245056 | A1 | 8/2015 | Lim et al. | |
| 2018/0184121 | A1 | 6/2018 | Kim et al. | |
| 2018/0316929 | A1 | 11/2018 | Li et al. | |
| 2019/0246139 | A1 | 8/2019 | Jeon et al. | |
| 2020/0296405 | A1* | 9/2020 | Huang | H04N 19/137 |
| 2022/0286688 | A1* | 9/2022 | Chen | H04N 19/567 |

FOREIGN PATENT DOCUMENTS

| | | |
|---|---|---|
| CN | 103402045 A | 11/2013 |
| CN | 105306952 A | 2/2016 |
| CN | 108781294 A | 11/2018 |
| CN | 109155855 A | 1/2019 |
| CN | 110324623 A | 10/2019 |
| CN | 110352598 A | 10/2019 |
| CN | 110446044 A | 11/2019 |
| CN | 110476424 A | 11/2019 |
| CN | 110557631 A | 12/2019 |
| CN | 110602493 A | 12/2019 |
| CN | 111050168 A | 4/2020 |
| CN | 111131837 A | 5/2020 |
| EP | 3471417 A1 | 4/2019 |
| WO | WO2017036399 A1 | 3/2017 |
| WO | WO2019093922 A1 | 5/2019 |
| WO | WO2019244809 A1 | 12/2019 |

OTHER PUBLICATIONS

Joint Video Experts leam (JVET) of ITU-T SG 16 WP 3 and ISO/IEC JTC 1/SC 29WG 11 12th Meeting,Publication date: Sep. 25, 2018(3 pages).
An Efficient Four-Parameter Affine Motion Model for Video Coding IEEE Transactions on Circuits and Systems for Video Technology Aug. 31, 2018(Aug. 31, 2018) No. 8 vol. 28 pp. 1934-1946.
Chinese First office action, Application No. 201911397687.6, mailed Nov. 3, 2021 (81 pages).
Chinese Second office action, Application No. 201911397687.6, mailed May 6, 2022(12 pages).
Chinese First office action,Application No. 201911383635.3, mailed Jan. 26, 2021(10 pages).
Chinese Notification to Grant Patent Right for Invention, Application No. 201911383635.3,mailed Jun. 25, 2021(7 pages).
International search report and Written Opinion of the International Search Authority,International Application No. PCT/CN2020/138402,mailed Mar. 10, 2021 (9 pages).
Huang (Qualcomm) H et al: "CE2-related: Simplified prediction refinement for affine motion compensation", 14. JVE Meeting; Mar. 19, 2019-Mar. 27, 2019; Geneva; (The Joint Video Exploration Team of ISO/IEC JTC 1/SC29/WG11 and ITU-T SG.16),No. JVET-N0504 Mar. 20, 2019, XP030203988(3 pages).
Luo (Interdigital) J et al: "CE2-related: Prediction refinement with optical flow for affine mode", 14. JVET Meeing; Mar. 19, 2019-Mar. 27, 2019; Geneva; (The Joint Video Exploration Team of ISO/IEC JTC1/SC29/ WG11 and ITU-T SG.16),No. JVET-N0236 Mar. 26, 2019 , XP030204984, pp. 1-7.
C-C Chen (Qualcomm) et al: "BoG report on CE2 sub-block based motion prediction related contributions", 126. MPEG Meeting; Mar. 25, 2019-Mar. 29, 2019; Geneva; (Motion Picture Expert Group or ISO/IEC JTC1/SC29/WG11),No. m47851 Mar. 21, 2019, XP030212173 (8 pages).
Xiu (Kwai) X et al: "On high-level control flags of BDOF and PROF", 16. JVET Meeting; Oct. 1, 2019-Oct. 11, 2019; Genva; (The Joint Video Exploration Team of ISO/IEC JTC1/SC29/WG11 and ITU-T SG.16), No. JVET-P0524 ; m50495 Oct. 6, 2019, XP030217576 (6 pages).
European Search Report,Application No. 20905556.5, mailed Dec. 12, 2022(10 pages).
European Examination Report, European Application No. 20905556.5, mailed Nov. 4, 2024 (5 pages).

* cited by examiner

AFFINE PREDICTION METHOD AND RELATED DEVICES

CROSS REFERENCE TO RELATED APPLICATIONS

This application is a continuation-application of International (PCT) Patent Application No. PCT/CN2020/138402, filed on Dec. 22, 2020, which claims priorities to Chinese Patent Application No. 201911383635.3, filed on Dec. 27, 2019, and Chinese Patent Application No. 201911397687.6, filed on Dec. 30, 2019, the contents of which are herein incorporated by reference in their entireties.

TECHNICAL FIELD

The described embodiments relate to a video coding technology, and more particularly, to an affine prediction method and related devices.

BACKGROUND

Due to a relatively large amount of video image data, the video image data is usually necessary to be encoded and compressed before the video image data is transmitted or stored. The encoded data is called a video stream. Since a limitation due to hardware and other conditions, such as limited storage space and limited transmission bandwidth, people hope that an encoder always makes the video stream as small as possible.

Video coding mainly includes processes such as prediction, transformation, quantization, and coding. The prediction is divided into two parts: intra-frame prediction and inter-frame prediction, which are used to remove spatial and temporal redundancy respectively.

The inter-frame prediction is to search for a block that best matches a current block in a reference frame image of the current block to predict the current block. The inter-frame prediction is divided into several modes, such as a conventional advanced motion vector prediction (AMVP) mode, a conventional merge mode, a triangle mode, a HASH mode, and an affine prediction mode. The affine prediction method needs to calculate prediction values of all pixels of a current coding block, and then prediction directions are determined based on the residuals between the prediction values of all pixels and the actual pixel values of the current coding block. In a kind of affine prediction method, calculation of the prediction value of all pixels in a current coding block mainly includes operations of calculating an initial prediction value, calculating a pixel compensation value, and calculating a final prediction value through the initial prediction value and the pixel compensation value.

SUMMARY

The present provides an affine prediction method and related devices, which may reduce computational complexity of an affine prediction method.

The present disclosure provides an affine prediction method, including: dividing a current coding block into multiple sub-blocks, and determining an initial prediction value of all pixels in each of the sub-blocks; dividing each of the sub-blocks into multiple fraction blocks, wherein at least one of the fraction blocks comprises at least two integer pixels; determining a motion vector difference and a gradient of each of the fraction blocks; calculating a pixel compensation value of each of the fraction blocks based on the motion vector difference value and the gradient; taking the pixel compensation value of each of the fraction blocks as a pixel compensation value of all pixels in each of the fraction blocks; and calculating a final prediction value of each pixel in the current coding block by the initial prediction value of each pixel and the pixel compensation value.

The present disclosure provides a codec, including a memory and a processor coupled to each other; wherein the memory stores a program file configured to realize the above-mentioned affine prediction method.

The present disclosure provides a storage device, including a program file stored in thereof; wherein and the program file is configured to realize the above-mentioned affine prediction method.

The method of the present disclosure is that, a current coding block may be divided into multiple sub-blocks, and initial prediction values of all pixels in each sub-block may be determined; then each of the sub-blocks may be divided into multiple fraction blocks, and at least one fraction block may include two integer pixels. The method of the present disclosure may only need to calculate a pixel compensation value of each of the fraction blocks and use the pixel compensation value of each of the fraction blocks as the pixel compensation value of all pixels in each of the fraction blocks, so there may be no need to calculate the pixel compensation values in each pixel in the current coding block. The pixel compensation value of an integer pixel may reduce the computational complexity of inter-frame prediction. Since difference between the pixel compensation value of adjacent pixels is very small, the pixel compensation value of a block may be used as the pixel compensation value of all pixels in the block, which may have little or no impact on a coding effect.

BRIEF DESCRIPTION OF THE DRAWINGS

In order to clearly illustrate the technical solutions of the present disclosure, the drawings used in the description of the embodiments will be briefly described. It is understood that, the drawings described herein are merely some embodiments of the present disclosure. Those skilled in the art may derive other drawings from these drawings without inventive effort.

DETAILED DESCRIPTION

In order to enable those skilled in the art to better understand the technical solutions of the present disclosure, the affine prediction method and related devices provided by the present disclosure will be described in further detail below with reference to the accompanying drawings and specific implementations.

Figure 1:
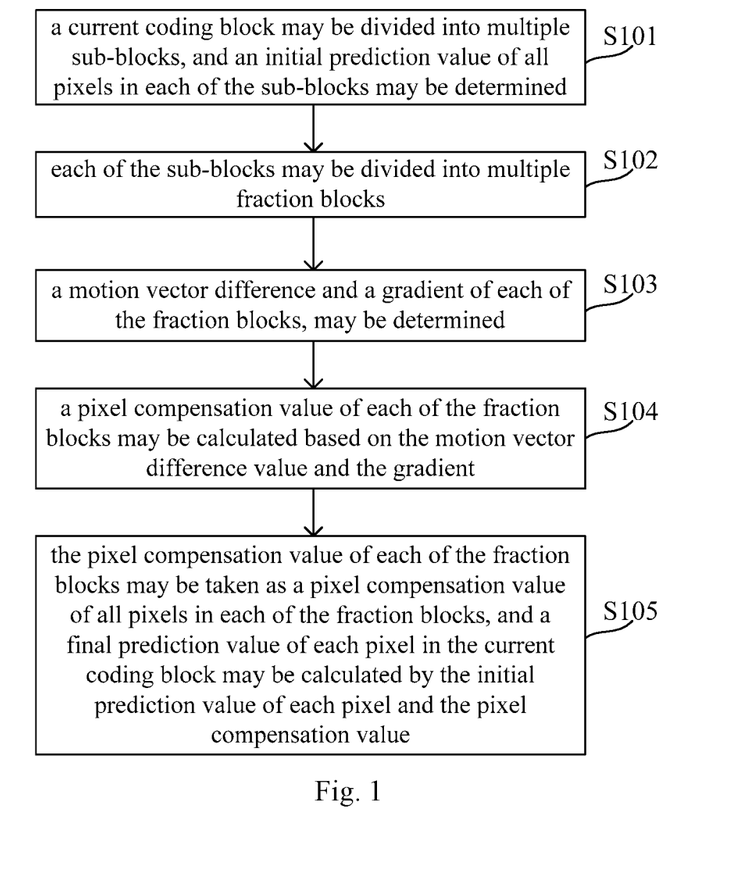
FIG. 1 is a flow chart of an affine prediction method in accordance with an embodiment in the present disclosure.

Referring to FIG. 1, FIG. 1 is a flow chart of an affine prediction method in accordance with an embodiment in the present disclosure. The affine prediction method is this embodiment may include operations in the following blocks.

Block S101, a current coding block may be divided into multiple sub-blocks, and an initial prediction value of all pixels in each of the sub-blocks may be determined.

The current coding block may be an image block to be coded in a current frame. The current frame may be sequentially coded in a certain order in a form of image blocks. The current coding block may be an image block to be coded next time in a current frame in this order. Each sub-block may have multiple specifications and sizes, such as specifications of 16×16, 32×32, or 32×16. The number may represent numbers in a row and in a column of a pixel in the current coding block.

After the current coding block is obtained, the current coding block may be divided into multiple sub-blocks. The sub-block may be a set of pixels with smaller specifications. The sub-block may be usually a specification of 4×4, and the sub-block may also be specifications of 4×4, 8×4, or 8×8. Moreover, in this embodiment, the specifications of all sub-blocks in the current coding block may be unified. That is, the current coding block may be divided into multiple sub-blocks with an array arrangement and uniform specifications. In other embodiments, the specifications of all sub-blocks in the current coding block may not be uniform.

After the current coding block is divided into the multiple sub-blocks, various methods may be adopted to determine the initial prediction values of all pixels in each of the sub-blocks. For example, an affine prediction method may be adopted to determine the initial prediction values of all pixels in each of the sub-blocks. It should be understood that, the "determining the initial prediction value of all pixels in each of the sub-blocks", may be "determining the initial prediction value of all integer pixels in each of the sub-blocks".

The determining the initial prediction value of all pixels in each of the sub-blocks by the affine prediction method may include the following operations. A motion vector (a control point motion vector, CPMV) of a control point (CP) of the current coding block may be determined. The motion vector of the control point in the current coding block may be weighted and calculated according to a position relationship of each of the sub-blocks in the current coding block, to obtain a motion vector (MV) of each of the sub-blocks in the current coding block. The initial prediction value of all pixels in each of the sub-blocks may be determined based on the motion vector of each of the sub-blocks. The position of the control point in the current coding block ($v_0$, $v_1$ in 4-parameter affine, or $v_0$, $v_1$, $v_2$ in 6-parameter affine) may be shown in FIG. 2.

Figure 2:
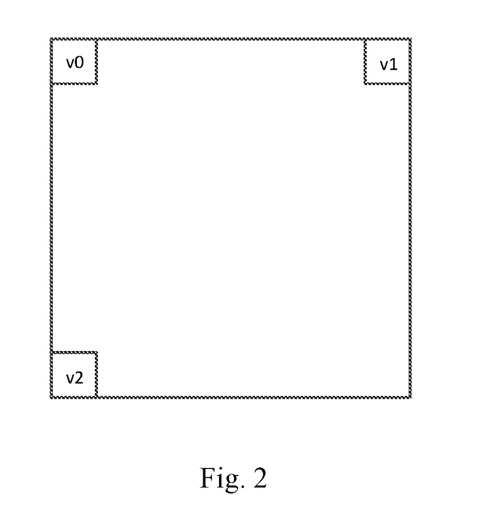
FIG. 2 is a schematic illustration of a position of a control point in a current coding block of the present disclosure.

The motion vector of the control point in the current coding block may be determined based on an existing affine_AMVP method or affine_MERGE method. The existing affine_AMVP method or affine_MERGE method may be the inter-frame prediction technology in the H.266 standard protocol document, therefore no more descriptions are given herein.

The motion vector of each of the sub-block may be calculated comprehensively according to the position relationship between a first center point of each of the sub-block, each of the control point, and the motion vector of the control point. Calculation formulas may be referred in formula (1) and formula (2), and it is not limited herein.

formula (1)

For a 4-parameter affine model $$\begin{cases} v_x = \dfrac{(v_{1x} - v_{0x})}{w}i - \dfrac{(v_{1y} - v_{0y})}{w}j + v_{0x} \\ v_y = \dfrac{(v_{1y} - v_{0y})}{w}i + \dfrac{(v_{1x} - v_{0x})}{w}j + v_{0y} \end{cases}$$

formula (2)

For a 6-parameter affine model $$\begin{cases} v_x = \dfrac{(v_{1x} - v_{0x})}{w}i + \dfrac{(v_{2x} - v_{0x})}{h}j + v_{0x} \\ v_y = \dfrac{(v_{1y} - v_{0y})}{w}i + \dfrac{(v_{2y} - v_{0y})}{h}j + v_{0y} \end{cases}$$

Coordinates ($v_{0x}$, $v_{0y}$), ($v_{1x}$, $v_{1y}$) ($v_{2x}$, $v_{2y}$) may be the CPMV of an upper left point, an upper right point, and a lower left point in the current coding block. Parameters w and h may be a width and a height of the current coding block. Parameters i and j may be offset values of a pixel in a coding block relative to the upper left point of the current coding block in the horizontal and vertical directions, respectively. When the motion vector of each of the sub-blocks is calculated, the horizontal and vertical offset values of the first center point of each of the sub-blocks relative to the upper left point of the current coding block, may need to be substituted into the formula (1) and the formula (2).

The initial prediction values of all pixels in each of the sub-blocks may be also possible to be determined based on the existing affine_AMVP method or affine_MERGE method according to the motion vector of each of the sub-block.

Block S102, each of the sub-blocks may be divided into multiple fraction blocks.

Each of the sub-blocks may be divided into multiple fraction blocks. At least one of the fraction blocks may include at least two integer pixels. It should be understood that, all sub-blocks may include at least one integer pixel to avoid calculating a pixel compensation value of a sub-block that does not include any integer pixel. It may prevent unnecessary calculations increased due to an existing fraction block that does not include any integer pixel.

In addition, a width or a height of at least one fraction block may be greater than 1.

Figure 3:
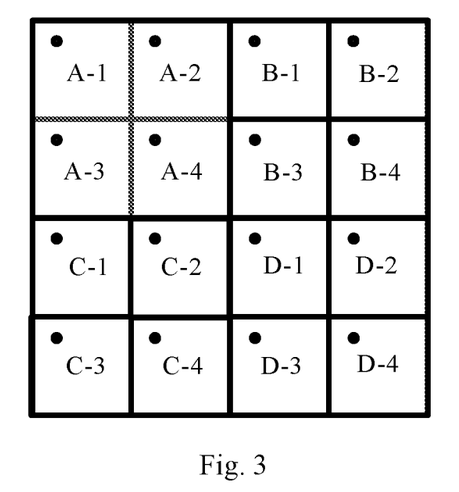
FIG. 3 is a schematic illustration of dividing all sub-blocks into multiple fraction blocks by a same division method in an affine prediction method of the present disclosure.
Figure 4:
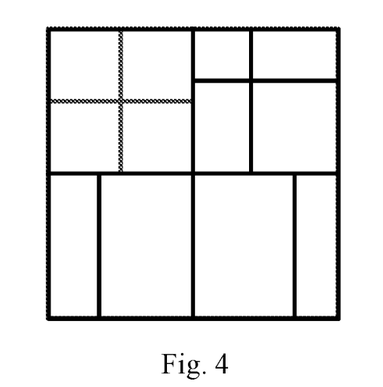
FIG. 4 is a schematic illustration of dividing all sub-blocks into multiple fraction blocks by different division methods in an affine prediction method of the present disclosure.

In this embodiment, as shown in FIG. 3, each of the sub-blocks may be divided into multiple fraction blocks by a same division method. In other embodiments, as shown in FIG. 4, each of the sub-blocks may also be divided into multiple fraction blocks by different division methods.

The division method configured to divide one sub-block into multiple fraction blocks may be described as the following.

In an embodiment, the sub-block may be horizontally divided, so that one sub-block may be divided into multiple fraction blocks arranged along a column direction.

In another embodiment, the sub-block may be vertically divided, so that one sub-block may be divided into multiple fraction blocks arranged along a row direction.

In further another embodiment, the sub-block may be divided horizontally and vertically in sequence, so that one sub-block may be divided into multiple fraction blocks arranged in an array.

It should be noted that, the sub-block may be divided horizontally and/or vertically N times. A ratio in each division may be not limited, and N may be a positive integer. For example, one sub-block may be divided into 2 fraction blocks horizontally, and then the 2 fraction blocks may be divided into 4 sub-blocks vertically.

Further, a width of each of the fraction blocks may be same, and a height of each of the fraction blocks may be same, i.e., a size of each of the fraction blocks may be same. For example, each of the fraction blocks may be arranged in 2×2. The width of each of the fraction blocks may also be different, and/or the height of each of the fraction blocks may also be different. For example, fraction blocks contained in one sub-block may be arranged in 2×2, and there also may be fraction blocks contained in another sub-block arranged in 2×4.

Further, the width and the height of each of the fraction blocks may be an integer, such as 1, 2, 3, or 4.

Further, a shape of each of the fraction blocks may also be same or different. For example, the sub-block may be divided by an L-shaped division, so that the sub-block may be divided into an L-shaped fraction block and a rectangular fraction block. The multiple fraction blocks divided by the L-shaped division may include at least one L-shaped block. A number and specifications of the L-shaped division may not be limited.

Block S103, a motion vector difference and a gradient of each of the fraction blocks, may be determined.

In an embodiment, the motion vector difference of each of the fraction blocks in any sub-block may be calculated first, and the motion vector difference of each of the fraction blocks in the sub-block may be multiplexed to other sub-blocks in the current coding block. For example, the motion vector difference of all fraction blocks in the A sub-block as shown in FIG. 3, i.e., the motion vector difference of a fraction block A-1, a fraction block A-2, a fraction block A-3, and a fraction block A-4, may be calculated. The motion vector difference of each of the fraction blocks in the sub-block A may be used as a motion vector difference of each fraction blocks in other sub-blocks corresponding to each of the fraction blocks in the sub-block A. For example, the motion vector difference of A-1 may be used as the motion vector difference of a fraction block B-1, a fraction block C-1, and a fraction block D-1. The difference of the motion vector of A-2 may be used as the motion vector difference of a fraction block B-2, a fraction block C-2, and a fraction block D-2. The difference of the motion vector of A-3 may be used as the difference of the motion vector of a fraction block B-3, a fraction block C-3, and a fraction block D-3. The difference of the motion vector of A-4 may be used as the motion vector difference of a fraction block B-4, a fraction block C-4, and a fraction block D-4.

Before the above-mentioned operations, all sub-blocks may be divided into multiple fraction blocks by a same division method, so that the motion vector difference of each fraction blocks in one sub-block may be multiplexed to other sub-blocks. It should be understood that, a gradient of each fraction block in all sub-blocks may need to be calculated.

In another embodiment, the motion vector difference and the gradient of each fraction blocks in all sub-blocks may be calculated.

Calculating the motion vector difference and the gradient of a fraction block may include the following operations. A pixel from all integer pixels and/or fraction pixels of the fraction block may be taken as a representative pixel. A motion vector difference and a gradient of the representative pixel may be calculated. The motion vector difference and the gradient of the representative pixel may be taken as a motion vector difference and a gradient of a fraction block to which the representative pixel belongs.

It should be understood that, when a size and a shape of each fraction block is unified, a position of the representative pixel in each fraction block may be unified. For example, as shown in FIG. 3, an offset value of the representative pixel (the black dot) of each fraction block relative to an upper left point of a fraction block to which the representative pixel belongs may be same in horizontal and vertical directions. A position of the representative pixel in each block may not be uniform. For example, an offset value of the representative pixel in some of the fraction blocks relative to an upper left point of a fraction block to which the representative pixel belongs in the horizontal and vertical directions, may be (1,1). The offset value of the representative pixel in a part of fraction blocks relative to an upper left point of a fraction block to which the representative pixel belongs in the horizontal and vertical directions, may be (0.5, 0.5).

The integer pixel may be a coded effective pixel. The fraction pixel may be a virtual pixel, which does not actually exist. The fraction pixel may be a pixel between two integer pixels. A fraction pixel prediction value (i.e., an initial prediction value and a final prediction value) may be obtained by interpolation of integer pixel.

The calculating the motion vector difference of the representative pixel may include the following operations. Horizontal and vertical offset values (n, m) of the representative pixel relative to a second center point of the sub-block to which the representative pixel belongs may be determined, and then the motion vector difference ($\Delta v_x$, $\Delta v_y$) may be calculated according to (n, m).

The motion vector difference ($\Delta v_x$, $\Delta v_y$) calculated according to (n, m), may be shown in the formula (3).

$$\begin{cases} \Delta v_x = c \times n + d \times m \\ \Delta v_y = e \times n + f \times m \end{cases} \quad \text{formula (3)}$$

The parameters c, d, e, and f may be calculated from the CPMV of a control point of the current coding block, and a width and a height of the current coding block. Details, may be referred to the formula (4) or formula (5).

$$\text{For a 4-parameter affine model} \begin{cases} c = f = \dfrac{v_{1x} - v_{0x}}{w} \\ e = -d = \dfrac{v_{1y} - v_{0y}}{w} \end{cases} \quad \text{formula (4)}$$

$$\text{For a 6-parameter affine model} \begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases} \quad \text{formula (5)}$$

The coordinators ($v_{0x}$, $v_{0y}$), ($v_{1x}$, $v_{1y}$), and ($v_{2x}$, $v_{2y}$) may be the CPMV of an upper left point, an upper right point and a lower left point of the current coding block. The parameters w and h may be the width and the height of the current coding block.

It should be understood that, the position of the second center point in each of the fraction block and the position of the first center point in the affine prediction may be same. A better final prediction value may be obtained by the affine prediction method of the present disclosure, to improve the pixel compensation accuracy. The first center point may be all integer pixels and/or any pixel in all fraction pixels of the sub-block to which the first center point belongs, that is, any pixel from all integer pixels and/or any pixel in all fraction pixels of the sub-block may be selected as the first center point and the second center point of the sub-block. The offset values of the first center point and the second center point in a same fraction block relative to an upper left point of the fraction block may be both (2, 2) or (1.5, 1.5), which may make the final prediction value more accurate, to further improve the pixel compensation accuracy. The position of the second center point and the position of the first center point in each fraction blocks may be different. For example, the offset value of the first center point in a fraction block relative to the upper left point of the block may be (2, 2), and the offset value of the second center point of the fraction block relative to the upper left point of the block may be (1.5, 1.5).

When the representative pixel is a fraction pixel, the initial prediction value of the adjacent fraction pixel may be used to calculate the gradient of the representative pixel. For example, when the representative pixel is a ½ fraction pixel, the adjacent initial prediction value of the ½ fraction pixel may be calculated the gradient of the representative pixel. When the representative pixel is an integer pixel, the initial prediction value of the adjacent integer pixel may be used to calculate the gradient of the representative pixel.

In an embodiment, a three-tapped filter may be used to calculate the gradient of the representative pixel. The gradient of representative pixels $[g_x(i, j), g_y(i, j)]$ may be calculated from the initial prediction value determined in block S101 in the formula as shown in the following.

$$\begin{cases} g_x(i, j) = I(i+1, j) - I(i-1, j) \\ g_y(i, j) = I(i, j+1) - I(i, j-1) \end{cases} \quad \text{formula (6)}$$

I(i+1, j), I(i−1, j), I(i, j+1), and I(i, j−1) may be initial prediction values of pixels (i+1, j), (i−1, j), (i, j+1), and (i, j−1), respectively.

In another embodiment, the gradient of the representative pixel may be calculated by a Sobel operator, which may improve the pixel compensation accuracy. The gradient of a pixel may be obtained by plane convolution of an image with the representative pixel as a center and a specification size of 3×3 with two kernels of the Sobel operator $[g_x(i, j), g_y(i, j)]$. The calculation formula may be shown as the following.

$$g_x(i, j) = \begin{bmatrix} -1 & 0 & 1 \\ -2 & 0 & 2 \\ -1 & 0 & 1 \end{bmatrix} * \begin{bmatrix} I(i-1, j-1) & I(i, j-1) & I(i+1, j-1) \\ I(i-1, j) & I(i, j) & I(i+1, j) \\ I(i-1, j+1) & I(i, j+1) & I(i+1, j+1) \end{bmatrix} =$$

$$-I(i-1, j-1) - 2I(i-1, j) - I(i-1, j+1) +$$
$$I(i+1, j-1) + 2I(i+1, j) + I(i+1, j+1) \quad \text{formula (7)}$$

$$g_y(i, j) = \begin{bmatrix} -1 & -2 & -1 \\ 0 & 0 & 0 \\ 1 & 2 & 1 \end{bmatrix} *$$

$$\begin{bmatrix} I(i-1, j-1) & I(i, j-1) & I(i+1, j-1) \\ I(i-1, j) & I(i, j) & I(i+1, j) \\ I(i-1, j+1) & I(i, j+1) & I(i+1, j+1) \end{bmatrix} = \quad \text{formula (8)}$$

$$-I(i-1, j-1) - 2I(i, j-1) - I(i+1, j-1) +$$
$$I(i-1, j+1) + 2I(i, j+1) + I(i+1, j+1)$$

I(i−1, j−1), I(i−1, j), I(i−1, j+1), I(i, j−1), I(i, j+1), I(i+1, j−1), I(i+1, j), and I(i+1, j+1) may be initial prediction values of pixels (i−1, j−1), (i−1, j), (i−1, j+1), (i, j−1), (i, j+1), (i+1, j−1), (i+1, j), and (i+1, j+1), respectively.

In another embodiment, the gradient of the representative pixel may be calculated by a gradient calculation method such as the Robert gradient operator and the Prewitt operator.

It should be understood that, the gradient of the representative pixels in each fraction blocks may be calculated by a same or different gradient calculation methods.

Block S104, a pixel compensation value of each of the fraction blocks may be calculated based on the motion vector difference value and the gradient.

The pixel compensation value (ΔI(i, j)) of each fraction block may be calculated by the motion vector difference and gradient of each of the fraction block. The calculation formula may be shown in formula (9) as the following, and it is not limited thereto.

$$\Delta I(i,j) = g_x(i,j) * \Delta v_x(i,j) + g_y(i,j) * \Delta v_y(i,j) \quad \text{formula (9)}$$

Block S105, the pixel compensation value of each of the fraction blocks may be taken as a pixel compensation value of all pixels in each of the fraction blocks, and a final prediction value of each pixel in the current coding block may be calculated by the initial prediction value of each pixel and the pixel compensation value.

The inventor of the present disclosure found that there is a very little difference between the pixel compensation value of adjacent pixels. The compensation value of one pixel may often represent the compensation value of adjacent pixels. Based on this, in the present disclosure, the pixel compensation value of the representative pixel in a fraction block may be calculated first, and then the pixel compensation value of all pixels in each fraction block may be unified as the pixel compensation value of the representative pixel in each fraction block. It may not only do not reduce the coding effect, but also greatly reduces the calculation complexity of the inter-frame prediction, and the calculation efficiency may be improved.

After the pixel compensation value of all pixels in the current coding block is determined, the final prediction value of each pixel in the current coding block may be calculated from the initial prediction value and pixel compensation value of each pixel. The calculation formula may be shown in formula (10) as the following. It should be understood that, "to calculate the final prediction value of each pixel in the current coding block" here may mean, "to calculate the final prediction value of each integer pixel in the current coding block".

$$I'(i,j) = I(i,j) + \Delta I(i,j) \quad \text{formula (10)}$$

I(i, j) may be an initial prediction value of a pixel (i, j), and ΔI(i, j) may be a pixel compensation value of a pixel (i, j), and I'(i, j) may be an initial prediction value of the pixel (i, J).

Further, an identifier may be set in a coding result of the current coding block or the slice of the current coding block. The identifier may be configured to indicate whether the current coding block needs to apply an affine prediction method of the present disclosure, or which affine prediction method of the present disclosure may be used to perform an inter-frame prediction method. Different identifiers may indicate different prediction methods.

For example, a new flag PROF_IMPROVE may be added to indicate which affine prediction method is adopted to perform an inter-frame prediction method in the current coding block.

When the flag PROF_IMPROVE is 0, it may indicate that the current coding block may be predicted according to a related art, and there may be no need to divide the sub-block into multiple fraction blocks.

When the flag PROF_IMPROVE is 1, it may indicate that the current coding block may need to divide one 4×4 sub-block into four pairs of 2×2 fraction blocks. The motion vector difference, the gradient and the pixel compensation value may be calculated, based on the pixels in the 2×2 fraction blocks. The offset value of the first center point and the second center point relative to the upper left point of the sub-block to which belong may be (1.5, 1.5), and the gradient calculation method may be the Sobel operator.

When the flag PROF_IMPROVE is 2, it may indicate that the current coding block may need to divide 4×4 sub-blocks into four pairs of 2×4 fraction blocks. The motion vector difference, the gradient and the pixel compensation value may be calculated, based on the pixels in the 2×4 fraction blocks. The offset value of the first center point and the second center point relative to the upper left point of the sub-block to which belong may be (2, 2), and the gradient calculation method may be the Prewitt operator.

It should be understood that, the flag PROF_IMPROVE may be set to different values to represent the positions of the first center point and the second center point, the division method configured to divide the sub-block into multiple fraction block, and different combinations of gradient calculation methods.

It should be understood that, the above-mentioned affine prediction method may be used not only to predict luminance components, but also to predict chrominance components.

Different from the related art, the present disclosure provides the affine prediction method and the related devices. The method of the present disclosure may include the operations in the following. The current coding block may be divided into the multiple sub-blocks, and the initial prediction values of all pixels in each of the sub-block may be determined; then each of the sub-blocks may be divided into the multiple fraction blocks, and at least one of the fraction block may include two integer pixels. The method of the present disclosure may only need to calculate the pixel compensation value of each of the fraction blocks and use the pixel compensation value of each of the fraction blocks as the pixel compensation value of all pixels in each of the fraction blocks, so there may be no need to calculate the pixel compensation values in each pixel in the current coding block. The pixel compensation value of an integer pixel may reduce the computational complexity of inter-frame prediction. Since difference between the pixel compensation value of adjacent pixels is very small, the pixel compensation value of the block may be used as the pixel compensation value of all pixels in the block, which may have little or no impact on a coding effect.

Figure 5:
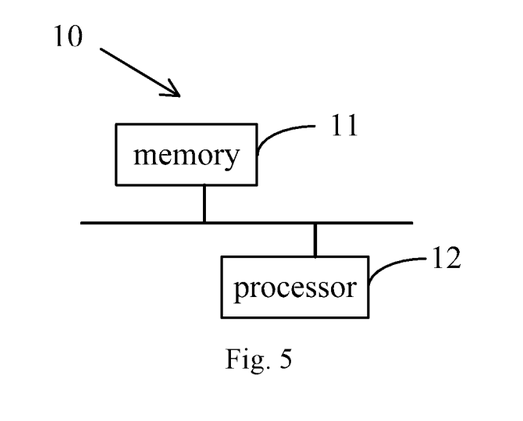
FIG. 5 is a structure illustration of a codec in accordance with an embodiment in the present disclosure.

The above-mentioned affine prediction method may be generally implemented by a codec, so that the present disclosure also provides a codec. Referring to FIG. 5, FIG. 5 is a structure illustration of a codec in accordance with an embodiment in the present disclosure. The codec 10 may include a processor 12 and a memory 11. The memory 11 may store a computer program. The processor 12 may be configured to execute the computer program to implement the operations in the above-mentioned affine prediction method.

Figure 6:
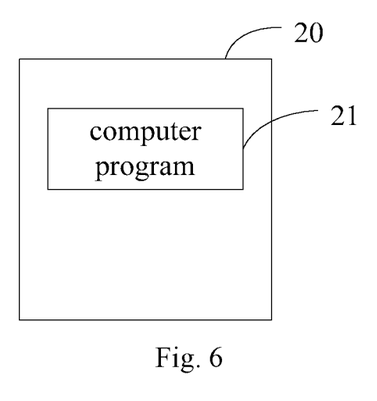
FIG. 6 is a structure illustration of a storage device in accordance with an embodiment in the present disclosure.

Logic processes of the above-mentioned affine prediction method may be presented as a computer program. In the field of computer program, when a computer program is sold or used as an independent software product, the computer program may be stored in a storage device. Therefore, the present disclosure provides a storage device. Referring to FIG. 6, FIG. 6 is a structure illustration of a storage device in accordance with an embodiment in the present disclosure. A computer program 21 may be stored in the storage device 20 of this embodiment. When the computer program is executed by a processor, the operations in the above-mentioned affine prediction method may be realized.

The storage device 20 may be a USB flash drive, a mobile hard disk, a read-only memory (ROM, read-only memory), a random access memory (RAM, random access memory), a disk drive or an optical disk, or other media that can store computer programs. The storage device 20 may also be a server configured to store the computer program, and the server may send the stored computer program to other devices to run, or the server may run the stored computer program itself. From a physical perspective, the storage device 20 may be a combination of multiple entities, such as multiple servers, servers plus storages, or storages plus mobile hard disks.

The above are only implementations of the present disclosure, and do not limit the scope of the present disclosure. Any equivalent structure or equivalent process transformation made by the description and drawings of the present disclosure, or directly or indirectly applied to other related technical fields, are similarly included in the scope of patent protection of the present disclosure.

What is claimed is:
1. An affine prediction method, comprising:
dividing a current coding block into multiple sub-blocks, and determining an initial prediction value of all pixels in each of the sub-blocks;
dividing each of the sub-blocks into multiple fraction blocks, wherein at least one of the fraction blocks comprises at least two integer pixels;
determining a motion vector difference and a gradient of each of the fraction blocks;
calculating a pixel compensation value of each of the fraction blocks based on the motion vector difference value and the gradient;
taking the pixel compensation value of each of the fraction blocks as a pixel compensation value of all pixels in each of the fraction blocks; and calculating a final prediction value of each pixel in the current coding block by the initial prediction value of each pixel and the pixel compensation value;
setting an identifier in a coding result of the current coding block or a coding result of a slice to which the current coding block belongs, wherein different identifiers indicate different prediction modes, the identifiers are set to different values to represent the positions of the first center point and the second center point, the division method configured to divide the sub-block into multiple fraction block, and different combinations of gradient calculation methods;
wherein the first center point is any pixel of all integer pixels and all fraction pixels in the sub-block to which the first center point belongs; or the first center point is any pixel of all integer pixels in the sub-block to which the first center point belongs; or the first center point is any pixel of all fraction pixels in the sub-block to which the first center point belongs;

the second center point is any pixel of all integer pixels and all fraction pixels in the sub-block to which the second center point belongs; or the second center point is any pixel of all integer pixels in the sub-block to which the second center point belongs; or the second center point is any pixel of all fraction pixels in the sub-block to which the second center point belongs.

2. The method as claimed in claim 1, wherein the dividing each of the sub-blocks into the multiple fraction blocks, comprises: dividing each of the sub-blocks into the multiple fraction blocks by a same division method;

the determining the motion vector difference and the gradient of each of the fraction blocks, comprises: calculating the motion vector difference of all of the fraction blocks in any sub-block, and taking the motion vector difference of each of the fraction blocks in the any sub-block as a motion vector difference of a corresponding block in other sub-blocks.

3. The method as claimed in claim 1, wherein all of the fraction blocks have a same width, and all of the fraction blocks have a same height; and the width and height of each of fraction blocks are integers.

4. The method as claimed in claim 1, wherein the determining the motion vector difference and the gradient of each of the fraction blocks, comprises:

taking a pixel from all integer pixels and all fraction pixels of each of the fraction blocks as a representative pixel; or taking a pixel from all integer pixels of each of the fraction blocks as a representative pixel; or taking a pixel from all fraction pixels of each of the fraction blocks as a representative pixel.

5. The method as claimed in claim 4, wherein after the taking the pixel from all of the integer pixels and all of the fraction pixels of each of the fraction blocks as the representative pixel or the taking the pixel from all of the integer pixels of each of the fraction blocks as the representative pixel or the taking the pixel from all of the fraction pixels of each of the fraction blocks as the representative pixel, the determining the motion vector difference and the gradient of each of the fraction blocks, further comprises:

calculating a motion vector difference and a gradient of the representative pixel, and taking the motion vector difference and the gradient of the representative pixel as a motion vector difference and the gradient of the fraction block to which the representative pixel belongs.

6. The method as claimed in claim 5, wherein the dividing the current coding block into the multiple sub-blocks, and the determining the initial prediction value of each of the sub-blocks, comprises: calculating a motion vector of each of the sub-blocks based on an offset of the first center point of each sub-block relative to an upper left point of the current coding block, and determining the initial prediction values of all pixels in the each of the sub-blocks according to the motion vector of each of the sub-blocks;

the calculating the motion vector difference and the gradient of the representative pixel, comprises: calculating the motion vector difference of the representative pixel according to a horizontal offset value and a vertical offset value of the representative pixel relative to the second center point of the sub-block to which the representative pixel belongs;

wherein positions of the first center point and the second center point in each of the sub-blocks are same.

7. The method as claimed in claim 6, wherein the offset of the first center point relative to the upper left point of the sub-block to which the first center point belongs is (2, 2) or (1.5, 1.5).

8. The method as claimed in claim 1, wherein the determining the motion vector difference and the gradient of each of the fraction blocks, comprises:

calculating the gradient of each of the fraction blocks based on a gradient calculation method; wherein the gradient calculation method comprises a three-tap filter, a Robert gradient operator, a Sobel operator, and a Prewitt operator.

9. A codec, comprising a memory and a processor coupled to each other, wherein the memory stores a program file configured to realize an affine prediction method, which comprises:

dividing a current coding block into multiple sub-blocks, and determining an initial prediction value of all pixels in each of the sub-blocks; dividing each of the sub-blocks into multiple fraction blocks, wherein at least one of the fraction blocks comprises at least two integer pixels;

determining a motion vector difference and a gradient of each of the fraction blocks;

calculating a pixel compensation value of each of the fraction blocks based on the motion vector difference value and the gradient;

taking the pixel compensation value of each of the fraction blocks as a pixel compensation value of all pixels in each of the fraction blocks; and calculating a final prediction value of each pixel in the current coding block by the initial prediction value of each pixel and the pixel compensation value;

setting an identifier in a coding result of the current coding block or a coding result of a slice to which the current coding block belongs, wherein different identifiers indicate different prediction modes, the identifiers are set to different values to represent the positions of the first center point and the second center point, the division method configured to divide the sub-block into multiple fraction block, and different combinations of gradient calculation methods;

wherein the first center point is any pixel of all integer pixels and all fraction pixels in the sub-block to which the first center point belongs; or the first center point is any pixel of all integer pixels in the sub-block to which the first center point belongs; or the first center point is any pixel of all fraction pixels in the sub-block to which the first center point belongs;

the second center point is any pixel of all integer pixels and all fraction pixels in the sub-block to which the second center point belongs; or the second center point is any pixel of all integer pixels in the sub-block to which the second center point belongs; or the second center point is any pixel of all fraction pixels in the sub-block to which the second center point belongs.

10. The codec as claimed in claim 9, wherein
the dividing each of the sub-blocks into the multiple fraction blocks, comprises: dividing each of the sub-blocks into the multiple fraction blocks by a same division method;
the determining the motion vector difference and the gradient of each of the fraction blocks, comprises: calculating the motion vector difference of all of the fraction blocks in any sub-block, and taking the motion vector difference of each of the fraction blocks in the any sub-block as a motion vector difference of a corresponding block in other sub-blocks.

11. The codec as claimed in claim 9, wherein
all of the fraction blocks have a same width, and all of the fraction blocks have a same height; and the width and height of each of fraction blocks are integers.

12. The codec as claimed in claim 9, wherein
the determining the motion vector difference and the gradient of each of the fraction blocks, comprises:
taking a pixel from all integer pixels and all fraction pixels of each of the fraction blocks as a representative pixel; or
taking a pixel from all integer pixels of each of the fraction blocks as a representative pixel; or
taking a pixel from all fraction pixels of each of the fraction blocks as a representative pixel;
calculating a motion vector difference and a gradient of the representative pixel, and taking the motion vector difference and the gradient of the representative pixel as a motion vector difference and the gradient of the fraction block to which the representative pixel belongs.

13. The codec as claimed in claim 12, wherein
the dividing the current coding block into the multiple sub-blocks, and the determining the initial prediction value of each of the sub-blocks, comprises: calculating a motion vector of each of the sub-blocks based on an offset of the first center point of each sub-block relative to an upper left point of the current coding block, and determining the initial prediction values of all pixels in the each of the sub-blocks according to the motion vector of each of the sub-blocks;
the calculating the motion vector difference and the gradient of the representative pixel, comprises: calculating the motion vector difference of the representative pixel according to a horizontal offset value and a vertical offset value of the representative pixel relative to the second center point of the sub-block to which the representative pixel belongs;
wherein positions of the first center point and the second center point in each of the sub-blocks are same.

14. The codec as claimed in claim 13, wherein
the offset of the first center point relative to the upper left point of the sub-block to which the first center point belongs is (2, 2) or (1.5, 1.5).

15. The codec as claimed in claim 9, wherein
the determining the motion vector difference and the gradient of each of the fraction blocks, comprises:
calculating the gradient of each of the fraction blocks based on a gradient calculation method; wherein the gradient calculation method comprises a three-tap filter, a Robert gradient operator, a Sobel operator, and a Prewitt operator.

16. A storage device, comprising a program file, and configured to realize an affine prediction method comprising:
dividing a current coding block into multiple sub-blocks, and determining an initial prediction value of all pixels in each of the sub-blocks; dividing each of the sub-blocks into multiple fraction blocks, wherein at least one of the fraction blocks comprises at least two integer pixels;
determining a motion vector difference and a gradient of each of the fraction blocks;
calculating a pixel compensation value of each of the fraction blocks based on the motion vector difference value and the gradient;
taking the pixel compensation value of each of the fraction blocks as a pixel compensation value of all pixels in each of the fraction blocks; and calculating a final prediction value of each pixel in the current coding block by the initial prediction value of each pixel and the pixel compensation value;
setting an identifier in a coding result of the current coding block or a coding result of a slice to which the current coding block belongs, wherein different identifiers indicate different prediction modes, the identifiers are set to different values to represent the positions of the first center point and the second center point, the division method configured to divide the sub-block into multiple fraction block, and different combinations of gradient calculation methods;
wherein the first center point is any pixel of all integer pixels and all fraction pixels in the sub-block to which the first center point belongs; or
the first center point is any pixel of all integer pixels in the sub-block to which the first center point belongs; or
the first center point is any pixel of all fraction pixels in the sub-block to which the first center point belongs;
the second center point is any pixel of all integer pixels and all fraction pixels in the sub-block to which the second center point belongs; or
the second center point is any pixel of all integer pixels in the sub-block to which the second center point belongs; or
the second center point is any pixel of all fraction pixels in the sub-block to which the second center point belongs.

* * * * *